United States Patent [19]
Cockell

[11] Patent Number: 6,011,926
[45] Date of Patent: Jan. 4, 2000

[54] HORIZON CONTROL

[76] Inventor: Patrick G. Cockell, 19 Rosehill Terrace, Brighton, United Kingdom, BN1 4JJ

[21] Appl. No.: 09/112,693

[22] Filed: Jul. 9, 1998

[51] Int. Cl.[7] .................................................. G03B 17/24
[52] U.S. Cl. ............................................ 396/50; 396/296
[58] Field of Search ............................... 396/50, 20, 281, 396/296

[56] References Cited

U.S. PATENT DOCUMENTS

| | | | |
|---|---|---|---|
| 4,801,793 | 1/1989 | Vaynshteyn | 396/50 |
| 5,313,713 | 5/1994 | Heger et al. | 33/366 |
| 5,903,782 | 5/1999 | Oxaal | 396/50 |

Primary Examiner—David M. Gray

[57] ABSTRACT

A horizon control for indicating to a user whether a camera is level with respective to the ground. The horizon control includes an x-axis level indicator for indicating to a user when the x-axis of the camera is level with the ground surface and a y-axis level indicator for indicating to a user when the y-axis of the camera is level with the ground surface. A x-axis level detector is provided for detecting whether the x-axis of the camera is level with the ground surface, the x-axis level detector is provided in the camera, the x-axis level detector is electrically connected to the x-axis level indicator. A y-axis level detector is provided for detecting whether the y-axis of the camera is level with the ground surface, the y-axis level detector is provided in the camera, the y-axis level detector is electrically connected to the y-axis level indicator.

12 Claims, 3 Drawing Sheets

HORIZON CONTROL

BACKGROUND OF THE INVENTION

1. Field of the Invention

The present invention relates to leveling devices for cameras and more particularly pertains to a new horizon control for indicating to a user whether a camera is level with respective to the ground.

2. Description of the Prior Art

The use of leveling devices for cameras is known in the prior art. More specifically, leveling devices for cameras heretofore devised and utilized are known to consist basically of familiar, expected and obvious structural configurations, notwithstanding the myriad of designs encompassed by the crowded prior art which have been developed for the fulfillment of countless objectives and requirements.

Known prior art leveling devices for cameras include U.S. Pat. No. 5,136,321; U.S. Pat. No. 5,313,713; U.S. Pat. No. 4,021,830; U.S. Pat. No. 4,231,649; U.S. Pat. No. 4,251,146; and U.S. Pat. No. Des. 354,762.

While these devices fulfill their respective, particular objectives and requirements, the aforementioned patents do not disclose a new horizon control. The inventive device includes an x-axis level indicator for indicating to a user when the x-axis of the camera is level with the ground surface and a y-axis level indicator for indicating to a user when the y-axis of the camera is level with the ground surface. A x-axis level detector is provided for detecting whether the x-axis of the camera is level with the ground surface, the x-axis level detector is provided in the camera, the x-axis level detector is electrically connected to the x-axis level indicator. A y-axis level detector is provided for detecting whether the y-axis of the camera is level with the ground surface, the y-axis level detector is provided in the camera, the y-axis level detector is electrically connected to the y-axis level indicator.

In these respects, the horizon control according to the present invention substantially departs from the conventional concepts and designs of the prior art, and in so doing provides an apparatus primarily developed for the purpose of indicating to a user whether a camera is level with respective to the ground.

SUMMARY OF THE INVENTION

In view of the foregoing disadvantages inherent in the known types of leveling devices for cameras now present in the prior art, the present invention provides a new horizon control construction wherein the same can be utilized for indicating to a user whether a camera is level with respective to the ground.

The general purpose of the present invention, which will be described subsequently in greater detail, is to provide a new horizon control apparatus and method which has many of the advantages of the leveling devices for cameras mentioned heretofore and many novel features that result in a new horizon control which is not anticipated, rendered obvious, suggested, or even implied by any of the prior art leveling devices for cameras, either alone or in any combination thereof.

To attain this, the present invention generally comprises an x-axis level indicator for indicating to a user when the x-axis of the camera is level with the ground surface and a y-axis level indicator for indicating to a user when the y-axis of the camera is level with the ground surface. A x-axis level detector is provided for detecting whether the x-axis of the camera is level with the ground surface, the x-axis level detector is provided in the camera, the x-axis level detector is electrically connected to the x-axis level indicator. A y-axis level detector is provided for detecting whether the y-axis of the camera is level with the ground surface, the y-axis level detector is provided in the camera, the y-axis level detector is electrically connected to the y-axis level indicator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new horizon control apparatus and method which has many of the advantages of the leveling devices for cameras mentioned heretofore and many novel features that result in a new horizon control which is not anticipated, rendered obvious, suggested, or even implied by any of the prior art leveling devices for cameras, either alone or in any combination thereof.

It is another object of the present invention to provide a new horizon control which may be easily and efficiently manufactured and marketed.

It is a further object of the present invention to provide a new horizon control which is of a durable and reliable construction.

An even further object of the present invention is to provide a new horizon control which is susceptible of a low cost of manufacture with regard to both materials and labor, and which accordingly is then susceptible of low prices of sale to the consuming public, thereby making such horizon control economically available to the buying public.

Still yet another object of the present invention is to provide a new horizon control which provides in the apparatuses and methods of the prior art some of the advantages thereof, while simultaneously overcoming some of the disadvantages normally associated therewith.

Still another object of the present invention is to provide a new horizon control for indicating to a user whether a camera is level with respective to the ground.

Yet another object of the present invention is to provide a new horizon control which includes an x-axis level indicator for indicating to a user when the x-axis of the camera is level with the ground surface and a y-axis level indicator for indicating to a user when the y-axis of the camera is level with the ground surface. A x-axis level detector is provided for detecting whether the x-axis of the camera is level with the ground surface, the x-axis level detector is provided in the camera, the x-axis level detector is electrically connected to the x-axis level indicator. A y-axis level detector is provided for detecting whether the y-axis of the camera is level with the ground surface, the y-axis level detector is provided in the camera, the y-axis level detector is electrically connected to the y-axis level indicator.

Still yet another object of the present invention is to provide a new horizon control that helps a user take level and properly framed photos by indicating to the user when the camera is not level with the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
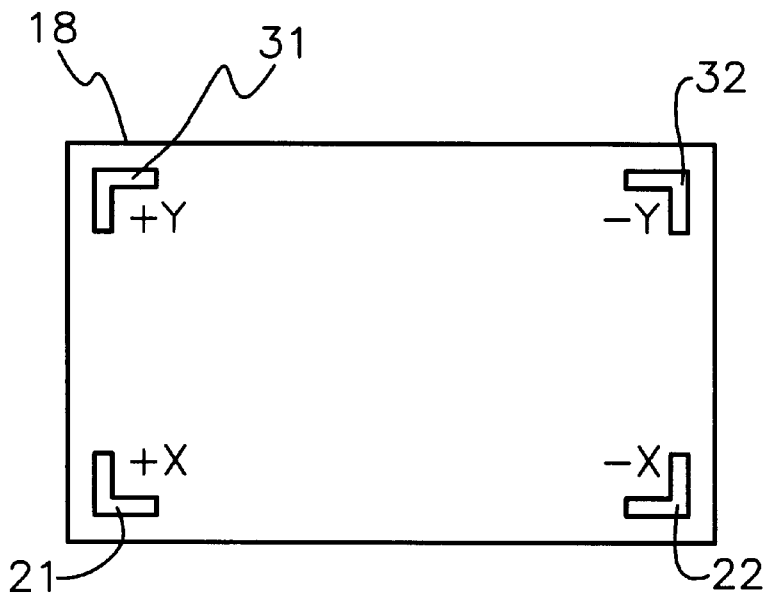
FIG. 1 is a schematic view of a viewfinder of a camera having the horizon control according to the present invention.

With reference now to the drawings, and in particular to FIGS. 1 through 5 thereof, a new horizon control embodying the principles and concepts of the present invention and generally designated by the reference numeral 10 will be described.

Figure 2:
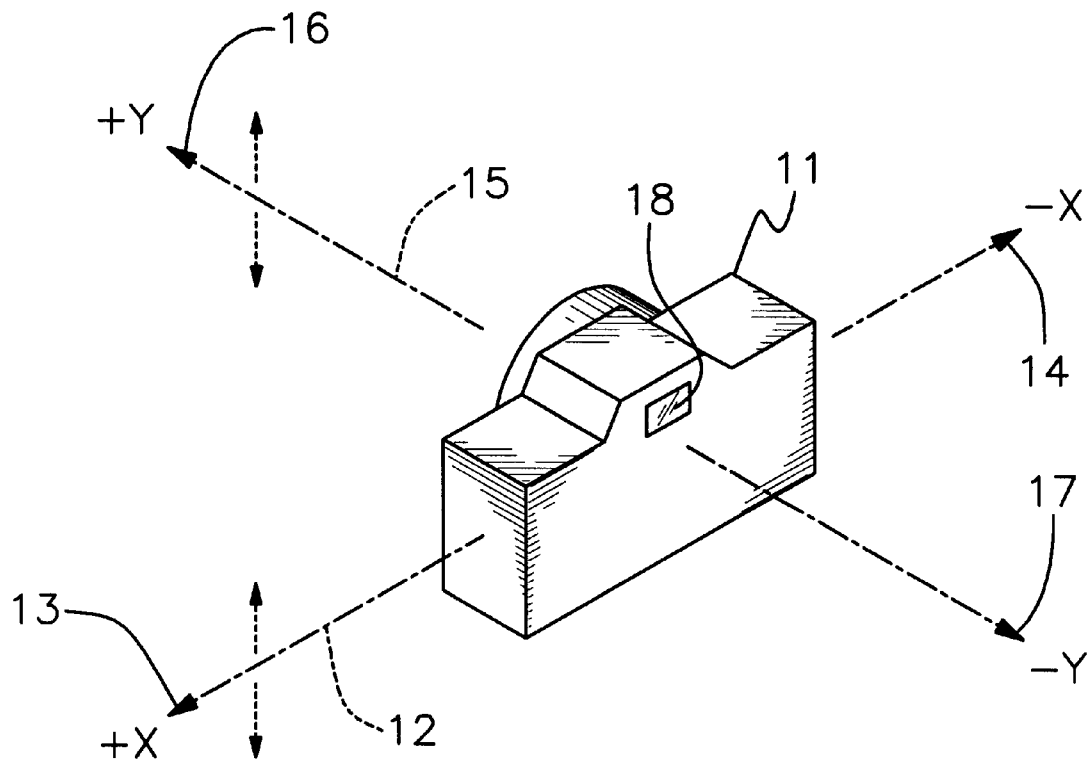
FIG. 2 is a schematic perspective view of a camera for use with the present invention.

In use, the horizon control 10 is designed for a camera 11 for indicating whether a plane of the camera 11 is level with respect to the ground surface. With reference to FIG. 2, the plane of the camera 11 has a x-axis 12 and a y-axis 15 extending from the camera 11. The y-axis 15 is extended perpendicular to the x-axis 12. Each axis extends in opposite first and second directions 13,14,16,17. The camera 11 has a generally rectangular viewfinder 18 having four corners. As best illustrated in FIGS. 1 through 5, the horizon control 10 generally comprises an x-axis level indicator 20 for indicating to a user when the x-axis 12 of the camera 11 is level with the ground surface and a y-axis level indicator 30 for indicating to a user when the y-axis 15 of the camera 11 is level with the ground surface. A x-axis level detector 40 is provided for detecting whether the x-axis 12 of the camera 11 is level with the ground surface, the x-axis level detector 40 is provided in the camera 11, the x-axis level detector 40 is electrically connected to the x-axis level indicator 20. A y-axis level detector 50 is provided for detecting whether the y-axis 15 of the camera 11 is level with the ground surface, the y-axis level detector 50 is provided in the camera 11, the y-axis level detector 50 is electrically connected to the y-axis level indicator 30.

Figure 3:
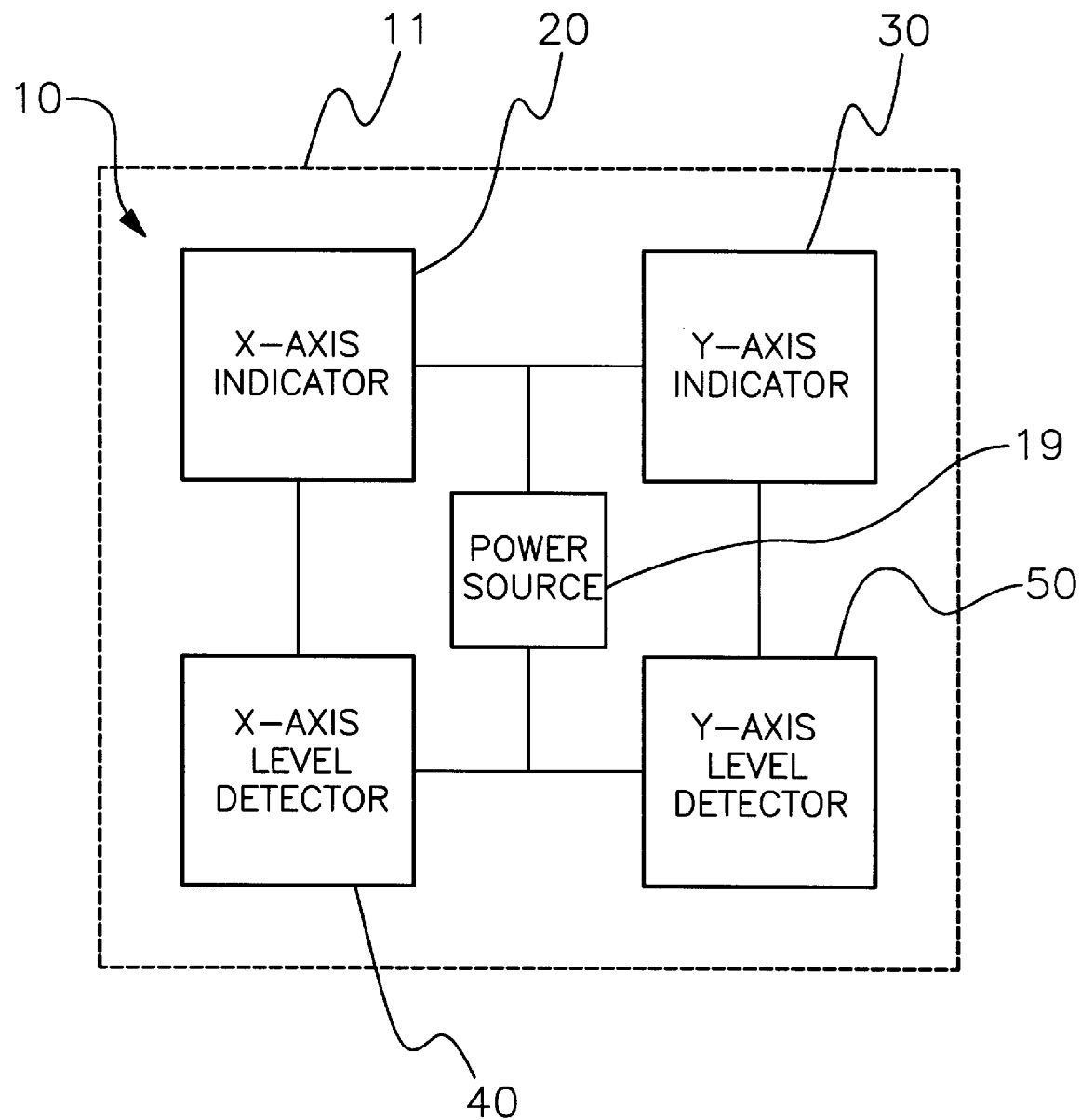
FIG. 3 is an electrical schematic of the present invention.

In closer detail, the horizon control 10, with reference to FIG. 3 comprises a power source 19 and level indicators 20,30 and level detectors 40,50 in a circuit. The x-axis level indicator 20 is designed for indicating to a user when the x-axis 12 of the camera 11 is level with the ground surface. The x-axis level indicator 20 is electrically connected to the power source 19. As illustrated in FIG. 1, the x-axis level indicator 20 preferably comprises a visual indicator for visually indicating to a user when the x-axis 12 of the camera 11 is level with the ground surface. The visual indicator of the x-axis level indicator 20 is provided in a viewfinder 18 of the camera 11. The visual indicator of the x-axis level indicator 20 has a first indicator 21 for indicating when the camera 11 is tilted in the first direction 13 of the x-axis 12. The visual indicator of the x-axis level indicator 20 also has a second indicator 22 for indicating when the camera 11 is tilted in the second direction 14 of the x-axis 12. Preferably, the first indicator 21 of the visual indicator of the x-axis level indicator 20 is positioned in one of the lower corners of the viewfinder 18 of the camera 11 while the second indicator 22 of the visual indicator of the x-axis level indicator 20 is positioned in another of the lower corners of the viewfinder 18 of the camera 11. The first and second indicators of the visual indicator of the x-axis level indicator 20 ideally comprise light sources such as L-shaped LED's in the viewfinder of the camera 11 with the light sources being activated or deactivated to indicate when the camera 11 is level or tilted in the x-axis.

The y-axis level indicator 30 is designed for indicating to a user when the y-axis 15 of the camera 11 is level with the ground surface. The y-axis level indicator 30 is electrically connected to the y-axis level detector 50 and to the power source 19. The y-axis level indicator 30 comprises a visual indicator for visually indicating to a user when the y-axis 15 of the camera 11 is level with the ground surface. The visual indicator of the y-axis level indicator 30 is also provided in the viewfinder 18 of the camera 11. The visual indicator of the y-axis level indicator 30 also has a first indicator 31 for indicating when the camera 11 is tilted in the first direction 16 of the y-axis 15 and a second indicator 32 for indicating when the camera 11 is tilted in the second direction 17 of the y-axis 15. The first indicator 31 of the visual indicator of the y-axis level indicator 30 is preferably positioned in one of the upper corners of the viewfinder 18 of the camera 11. The second indicator 32 of the visual indicator of the y-axis level indicator 30 is preferably positioned in another of the upper corners of the viewfinder 18 of the camera 11. Like the x-level indicator, the first and second indicators 31,32 of the visual indicator of the y-axis level indicator 30 ideally comprise light sources such as L-shaped LED's in the viewfinder of the camera 11 that are activated or deactivated to indicate when the camera 11 is level or tilted in the y-axis 15.

The x-axis level detector 40 is designed for detecting whether the x-axis 12 of the camera 11 is level with the ground surface. The x-axis level detector 40 is provided in the camera 11. The x-axis level indicator 20 is electrically connector to the power source 19 and is electrically connected to the x-axis level indicator 20. The y-axis level detector 50 is designed for detecting whether the y-axis 15 of the camera 11 is level with the ground surface. The y-axis level detector 50 is also provided in the camera 11. The y-axis level indicator 30 is electrically connector to the power source 19 and to the y-axis level indicator 30.

Figure 5:
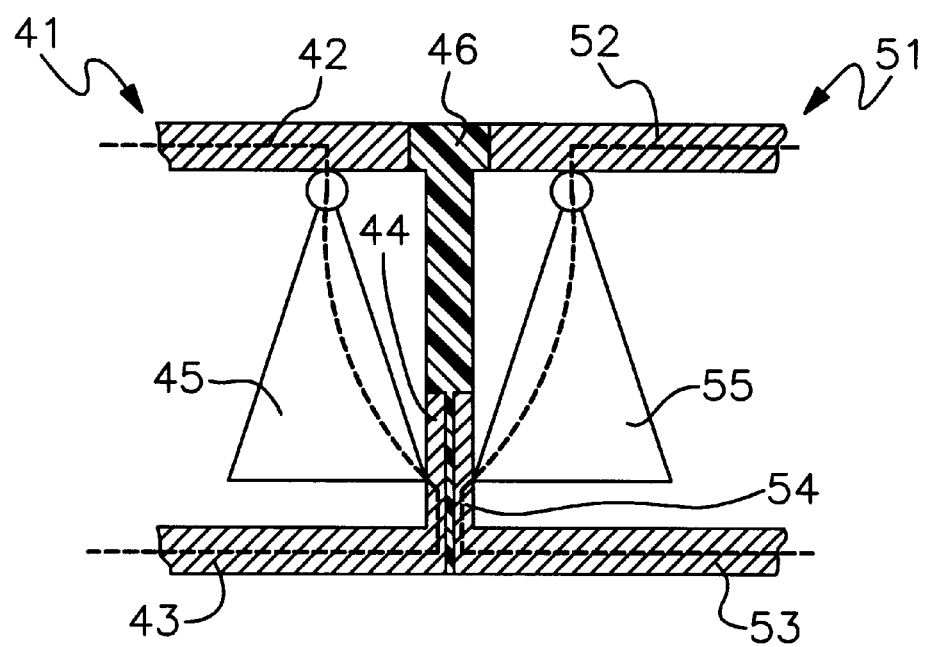
FIG. 5 is a schematic side view of another mode of switch of the present invention.

With reference to FIG. 5, each of the level detectors comprises a first direction level switch 41 and a second direction level switch 51. The first direction level switch is designed for completing a circuit between the level detector and the electrically connected the first indicator of the visual indicator of the associated level indicator when the camera 11 is level in the first direction of the associated axis of the level detector to the ground surface. The second direction level switch 51 is designed for completing a circuit between the level detector and the electrically connected associated level indicator when the camera 11 is level in the second direction of the associated axis of the level detector to the ground surface. The directional switches are aligned along the length of their associated axis they are detecting levelness.

The first direction level switch 41 comprises spaced apart upper and lower frames 42,43, a cross frame 45, and a pendulum connector 45. The frames of the first direction level switch 41 are electrically conductive and the upper frame 42 of the first direction level switch 41 is electrically connected to the associated level detector. The lower frame 43 of the first direction level switch 41 is electrically connected to the associated level detector. The cross frame 44 of the first direction level switch 41 is in electrical communication with the lower frame 43 of the first direction level switch 41. The cross frame 44 of the first direction level switch 41 is electrically insulated from the upper frame 42 of the first direction level switch 41 by an insulator 46. The pendulum connector 45 of the first direction level switch 41 is pivotally suspended from the upper frame 42 of the first direction level switch 41. The pendulum connector 45 of the first direction level switch 41 also comprises an electrically conductive material. The pendulum connector 45 of the first direction level switch 41 is in electrical contact 47 with the cross frame 44 of the first direction level switch 41 to complete a circuit between the upper and lower frames 42,43 when the associated axis of the camera 11 is level with the ground surface. In use, the pendulum connector 45 of the first direction level switch 41 is pivoted away from the cross frame 44 of the first direction level switch 41 to break a circuit between the upper and lower frames 42,43 when the camera 11 is tilted in the first direction of the associated axis to be not level with the ground surface.

The second direction level switch 51 comprising spaced apart upper and lower frames 52,53, a cross frame 54, and a pendulum connector 55. The frames of the second direction level switch 51 are electrically conductive. The upper frame 52 of the second direction level switch 51 is electrically connected to the associated level detector. The lower frame 53 of the second direction level switch 51 is electrically connected to the second indicator of the visual indicator of the associated level detector and the cross frame 54 of the second direction level switch 51 is in electrical communication with the lower frame 53 of the second direction level switch 51. The cross frame 54 of the second direction level switch 51 is also electrically insulated from the upper frame 52 of the second direction level switch 51 by an insulator. Ideally, the frames of the second direction level switch 51 are abutted together and separated by the non-electrical conducting insulator. The pendulum connector 55 of the second direction level switch 51 is pivotally suspended from the upper frame 52 of the second direction level switch 51. The pendulum connector 55 of the second direction level switch 51 comprises an electrically conductive material. In use, the pendulum connector 55 of the second direction level switch 51 is in electrical contact with the cross frame 54 of the second direction level switch 51 to complete a circuit between the upper and lower frames when the associated axis of the camera 11 is level with the ground surface. The pendulum connector 55 of the second direction level switch 51 is pivoted away from the cross frame 54 of the second direction level switch 51 to break a circuit between the upper and lower frames when the camera 11 is tilted in the first direction of the associated axis to be not level with the ground surface.

Figure 4:
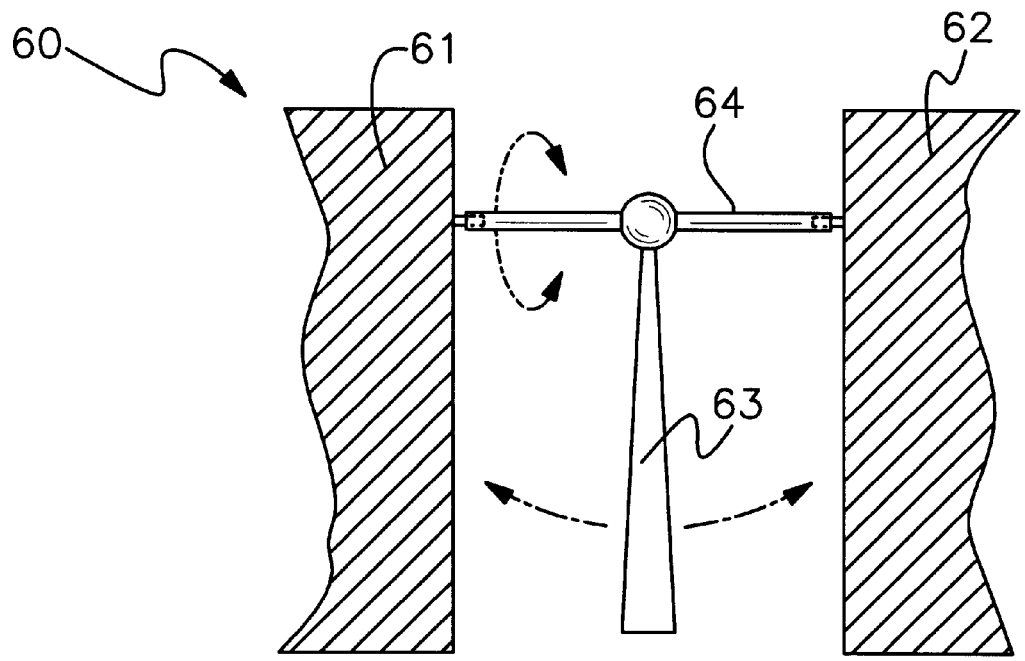
FIG. 4 is a schematic side view of one mode of switch of the present invention.

With reference to FIG. 4, in an additional embodiment, each of the level detectors may comprise a switch 60 for completing a circuit between the level detector and the associate level indicator. This switch 60 has a pair of side connectors 61,62 with one of the side connectors 61 electrically connected to the first indicator of the visual indicator of the associated level indicator and the other side connectors 61 electrically connected to the second indicator of the visual indicator of the associated level indicator. A pendulum connector 63 is pivotally suspended 64 between the side connectors 61,62, the pendulum completing a circuit between the first indicator and the one side connector when the pendulum connector 63 is tilted in the first direction of the associated axis. In use, the pendulum completes a circuit between the second indicator and the another side connector when the pendulum connector 63 is tilted in the second direction of the associated axis.

In an illustrative use, when the camera is tilted in one of the directions of the axes 12,15 of the camera 11, the switch of the level detector for that direction turn off (or alternatively, turn on) the indicator for that direction to indicate to the user to adjust the camera in the appropriate contrary direction of the axis. When the camera is level in the indicators will all be on (or off in the alternate embodiment) to indicate to the user that the camera is level with the ground surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A horizon control for a camera for indicating whether a plane of the camera is level with respect to the ground surface, the plane of the camera having a x-axis and a y-axis extending from the camera, the y-axis being extended perpendicular to the x-axis, each axis extending in opposite first and second directions, the camera having a generally rectangular viewfinder having four corners, said horizon control comprising:

an x-axis level indicator for indicating to a user when the x-axis of the camera is level with the ground surface;

a y-axis level indicator for indicating to a user when the y-axis of the camera is level with the ground surface;

a x-axis level detector for detecting whether the x-axis of the camera is level with the ground surface, said x-axis level detector being provided in the camera, said x-axis level detector being electrically connected to said x-axis level indicator; and a y-axis level detector for detecting whether the y-axis of the camera is level with the ground surface, said y-axis level detector being provided in the camera, said y-axis level detector being electrically connected to said y-axis level indicator;

wherein said x-axis level indictor comprises a visual indicator for visually indicating to a user when the x-axis of the camera is level with the ground surface, wherein said y-axis level indictor comprises a visual indicator for visually indicating to a user when the y-axis of the camera is level with the ground surface;

wherein said visual indicator of said x-axis level indicator is provided in a viewfinder of the camera, said visual indicator of said x-axis level indicator having a first indicator for indicating when the camera is tilted in said first direction of said x-axis, said visual indicator of said x-axis level indicator having a second indicator for indicating when the camera is tilted in said second direction of said x-axis, and wherein said visual indicator of said y-axis level indicator is provided in a viewfinder of the camera, said visual indicator of said y-axis level indicator having a first indicator for indicating when the camera is tilted in said first direction of said y-axis, said visual indicator of said y-axis level indicator having a second indicator for indicating when the camera is tilted in said second direction of said y-axis.

2. The horizon control of claim 1, wherein said first and second indicators of said visual indicator of said x-axis level indicator and said y-axis level indicator comprise light sources.

3. The horizon control of claim 1, wherein each of said level detectors comprises a first direction level switch for completing a circuit between the level detector and the electrically connected the first indicator of the visual indicator of the associated level indicator when the camera is level in the first direction of the associated axis of the level detector to the ground surface and a second direction level switch for completing a circuit between the level detector and the electrically connected associated level indicator when the camera is level in the second direction of the associated axis of the level detector to the ground surface.

4. The horizon control of claim 3, wherein said first direction level switch comprises:

spaced apart upper and lower frames, a cross frame, and a pendulum connector, said frames of said first direction level switch being electrically conductive, said upper frame of said first direction level switch being electrically connected to the associated level detector, said lower frame of said first direction level switch being electrically connected to the associated level detector, said cross frame of said first direction level switch being in electrical communication with said lower frame of said first direction level switch;

said pendulum connector of said first direction level switch being pivotally suspended from said upper frame of said first direction level switch, said pendulum connector of said first direction level switch comprising an electrically conductive material;

said pendulum connector of said first direction level switch being in electrical contact with said cross frame of said first direction level switch to complete a circuit between said upper and lower frames when the associated axis of the camera is level with the ground surface; and said pendulum connector of said first direction level switch being pivoted away from said cross frame of said first direction level switch to break a circuit between said upper and lower frames when the camera is tilted in the first direction of the associated axis.

5. The horizon control of claim 3, wherein said second direction level switch comprises:

spaced apart upper and lower frames, a cross frame, and a pendulum connector;

said frames of said second direction level switch being electrically conductive, said upper frame of said second direction level switch being electrically connected to the associated level detector, said lower frame of said second direction level switch being electrically connected to the second indicator of the visual indicator of the associated level detector, said cross frame of said second direction level switch being in electrical communication with said lower frame of said second direction level switch;

said pendulum connector of said second direction level switch being pivotally suspended from said upper frame of said second direction level switch, said pendulum connector of said second direction level switch comprising an electrically conductive material;

said pendulum connector of said second direction level switch being in electrical contact with said cross frame of said second direction level switch to complete a circuit between said upper and lower frames when the associated axis of the camera is level with the ground surface; and said pendulum connector of said second direction level switch being pivoted away from said cross frame of said second direction level switch to break a circuit between said upper and lower frames when the camera is tilted in the first direction of the associated axis.

6. A horizon control for a camera for indicating whether a plane of the camera is level with respect to the ground surface, the plane of the camera having a x-axis and a y-axis extending from the camera, the y-axis being extended perpendicular to the x-axis, each axis extending in opposite first and second directions, the camera having a generally rectangular viewfinder having four corners, said horizon control comprising:

an x-axis level indicator for indicating to a user when the x-axis of the camera is level with the ground surface;

a y-axis level indicator for indicating to a user when the y-axis of the camera is level with the ground surface;

a x-axis level detector for detecting whether the x-axis of the camera is level with the ground surface, said x-axis level detector being provided in the camera, said x-axis level detector being electrically connected to said x-axis level indicator; and a y-axis level detector for detecting whether the y-axis of the camera is level with the ground surface, said y-axis level detector being provided in the camera, said y-axis level detector being electrically connected to said y-axis level indicator;

wherein each of said level detectors comprises a first direction level switch for completing a circuit between the level detector and the electrically connected the first indicator of the visual indicator of the associated level indicator when the camera is level in the first direction of the associated axis of the level detector to the ground surface and a second direction level switch for completing a circuit between the level detector and the electrically connected associated level indicator when the camera is level in the second direction of the associated axis of the level detector to the ground surface.

7. The horizon control of claim 6, wherein said x-axis level indictor comprises a visual indicator for visually indicating to a user when the x-axis of the camera is level with the ground surface, wherein said y-axis level indictor comprises a visual indicator for visually indicating to a user when the y-axis of the camera is level with the ground surface.

8. The horizon control of claim 6, wherein said first direction level switch comprises:

spaced apart upper and lower frames, a cross frame, and a pendulum connector, said frames of said first direction level switch being electrically conductive, said upper frame of said first direction level switch being electrically connected to the associated level detector, said lower frame of said first direction level switch being electrically connected to the associated level detector, said cross frame of said first direction level switch being in electrical communication with said lower frame of said first direction level switch;

said pendulum connector of said first direction level switch being pivotally suspended from said upper frame of said first direction level switch, said pendulum connector of said first direction level switch comprising an electrically conductive material;

said pendulum connector of said first direction level switch being in electrical contact with said cross frame of said first direction level switch to complete a circuit between said upper and lower frames when the associated axis of the camera is level with the ground surface; and said pendulum connector of said first direction level switch being pivoted away from said cross frame of said first direction level switch to break a circuit between said upper and lower frames when the camera is tilted in the first direction of the associated axis.

9. The horizon control of claim 6, wherein said second direction level switch comprises:

spaced apart upper and lower frames, a cross frame, and a pendulum connector;

said frames of said second direction level switch being electrically conductive, said upper frame of said second direction level switch being electrically connected to the associated level detector, said lower frame of said second direction level switch being electrically connected to the second indicator of the visual indicator of the associated level detector, said cross frame of said second direction level switch being in electrical communication with said lower frame of said second direction level switch;

said pendulum connector of said second direction level switch being pivotally suspended from said upper frame of said second direction level switch, said pendulum connector of said second direction level switch comprising an electrically conductive material;

said pendulum connector of said second direction level switch being in electrical contact with said cross frame of said second direction level switch to complete a circuit between said upper and lower frames when the associated axis of the camera is level with the ground surface; and said pendulum connector of said second direction level switch being pivoted away from said cross frame of said second direction level switch to break a circuit between said upper and lower frames when the camera is tilted in the first direction of the associated axis.

10. The horizon control of claim 7, wherein said visual indicator of said x-axis level indicator is provided in a viewfinder of the camera, said visual indicator of said x-axis level indicator having a first indicator for indicating when the camera is tilted in said first direction of said x-axis, said visual indicator of said x-axis level indicator having a second indicator for indicating when the camera is tilted in said second direction of said x-axis, and wherein said visual indicator of said y-axis level indicator is provided in a viewfinder of the camera, said visual indicator of said y-axis level indicator having a first indicator for indicating when the camera is tilted in said first direction of said y-axis, said visual indicator of said y-axis level indicator having a second indicator for indicating when the camera is tilted in said second direction of said y-axis.

11. The horizon control of claim 10, wherein said first and second indicators of said visual indicator of said x-axis level indicator and said y-axis level indicator comprise light sources.

12. A horizon control for a camera for indicating whether a plane of the camera is level with respect to the ground surface, the plane of the camera having a x-axis and a y-axis extending from the camera, the y-axis being extended perpendicular to the x-axis, each axis extending in opposite first and second directions, the camera having a generally rectangular viewfinder having four corners, said horizon control comprising:

a power source;

an x-axis level indicator for indicating to a user when the x-axis of the camera is level with the ground surface, said x-axis level indictor comprising a visual indicator for visually indicating to a user when the x-axis of the camera is level with the ground surface, said y-axis level indicator being electrically connected to said power source;

said visual indicator of said x-axis level indicator being provided in a viewfinder of the camera, said visual indicator of said x-axis level indicator having a first indicator for indicating when the camera is tilted in said first direction of said x-axis, said visual indicator of said x-axis level indicator having a second indicator for indicating when the camera is tilted in said second direction of said x-axis;

said first indicator of said visual indicator of said x-axis level indicator being positioned in one of the lower corners of the viewfinder of the camera, said second indicator of said visual indicator of said x-axis level indicator being positioned in another of the lower corners of the viewfinder of the camera;

said first and second indicators of said visual indicator of said x-axis level indicator comprising light sources;

a y-axis level indicator for indicating to a user when the y-axis of the camera is level with the ground surface, said y-axis level indicator being electrically connected to said y-axis level detector, said y-axis level indictor comprising a visual indicator for visually indicating to a user when the y-axis of the camera is level with the ground surface, said y-axis level indicator being electrically connected to said power source;

said visual indicator of said y-axis level indicator being provided in a viewfinder of the camera, said visual indicator of said y-axis level indicator having a first indicator for indicating when the camera is tilted in said first direction of said y-axis, said visual indicator of said y-axis level indicator having a second indicator for indicating when the camera is tilted in said second direction of said y-axis;

said first indicator of said visual indicator of said y-axis level indicator being positioned in one of the upper corners of the viewfinder of the camera, said second indicator of said visual indicator of said y-axis level indicator being positioned in another of the upper corners of the viewfinder of the camera;

said first and second indicators of said visual indicator of said y-axis level indicator comprising light sources;

a x-axis level detector for detecting whether the x-axis of the camera is level with the ground surface, said x-axis level detector being provided in the camera, said x-axis level indicator being electrically connector to said power source, said x-axis level detector being electrically connected to said x-axis level indicator;

a y-axis level detector for detecting whether the y-axis of the camera is level with the ground surface, said y-axis level detector being provided in the camera, said y-axis level indicator being electrically connector to said power source, said y-axis level detector being electrically connected to said y-axis level indicator; and wherein each of said level detectors comprises:

a first direction level switch for completing a circuit between the level detector and the electrically connected the first indicator of the visual indicator of the associated level indicator when the camera is level in the first direction of the associated axis of the level detector to the ground surface;

said first direction level switch comprising spaced apart upper and lower frames, a cross frame, and a pendulum connector;

said frames of said first direction level switch being electrically conductive, said upper frame of said first direction level switch being electrically connected to the associated level detector, said lower frame of said first direction level switch being electrically connected to the associated level detector, said cross frame of said first direction level switch being in electrical communication with said lower frame of said first direction level switch;

said pendulum connector of said first direction level switch being pivotally suspended from said upper frame of said first direction level switch, said pendulum connector of said first direction level switch comprising an electrically conductive material;

said pendulum connector of said first direction level switch being in electrical contact with said cross frame of said first direction level switch to complete a circuit between said upper and lower frames when the associated axis of the camera is level with the ground surface;

said pendulum connector of said first direction level switch being pivoted away from said cross frame of said first direction level switch to break a circuit between said upper and lower frames when the camera is tilted in the first direction of the associated axis;

a second direction level switch for completing a circuit between the level detector and the electrically connected associated level indicator when the camera is level in the second direction of the associated axis of the level detector to the ground surface;

said second direction level switch comprising spaced apart upper and lower frames, a cross frame, and a pendulum connector;

said frames of said second direction level switch being electrically conductive, said upper frame of said second direction level switch being electrically connected to the associated level detector, said lower frame of said second direction level switch being electrically connected to the second indicator of the visual indicator of the associated level detector, said cross frame of said second direction level switch being in electrical communication with said lower frame of said second direction level switch;

said pendulum connector of said second direction level switch being pivotally suspended from said upper frame of said second direction level switch, said pendulum connector of said second direction level switch comprising an electrically conductive material;

said pendulum connector of said second direction level switch being in electrical contact with said cross frame of said second direction level switch to complete a circuit between said upper and lower frames when the associated axis of the camera is level with the ground surface; and said pendulum connector of said second direction level switch being pivoted away from said cross frame of said second direction level switch to break a circuit between said upper and lower frames when the camera is tilted in the first direction of the associated axis.

* * * * *